(No Model.)

O. PEDERSON.
ROTARY CUTTER.

No. 462,157. Patented Oct. 27, 1891.

WITNESSES
Chapman Fowler
R. Tweed Miller

INVENTOR
Ole Pederson.
by A. H. Evans & Co
Attorneys

THE NORRIS PETERS CO., PHOTO-LITHO., WASHINGTON, D. C.

UNITED STATES PATENT OFFICE.

OLE PEDERSON, OF MOLINE, ASSIGNOR OF ONE-HALF TO JAMES D. WILLIAMS, OF CHICAGO, ILLINOIS.

ROTARY CUTTER.

SPECIFICATION forming part of Letters Patent No. 462,157, dated October 27, 1891.

Application filed April 2, 1891. Serial No. 387,329. (No model.)

*To all whom it may concern:*

Be it known that I, OLE PEDERSON, a citizen of the United States, residing at Moline, in the county of Rock Island and State of Illinois, have invented new and useful Improvements in Rotary Cutters, of which the following is a full and clear description, reference being had to the accompanying drawings, forming part of this specification, in which—

Figure 1:
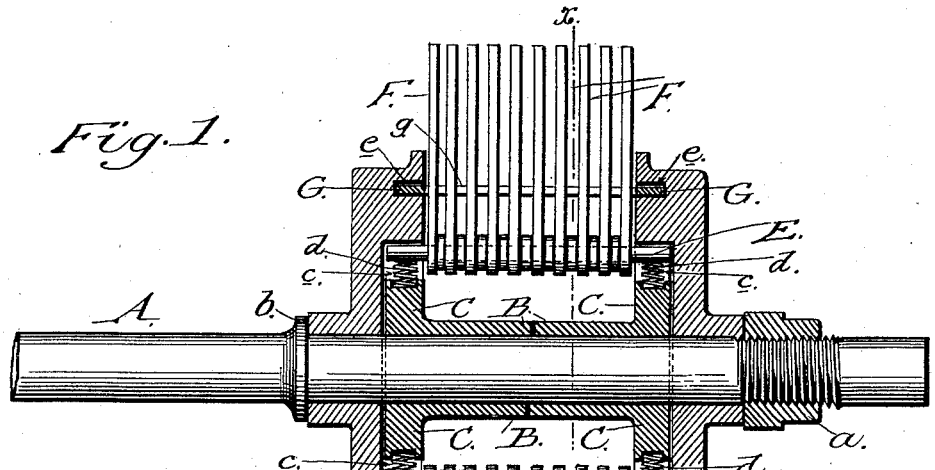
Figure 3:
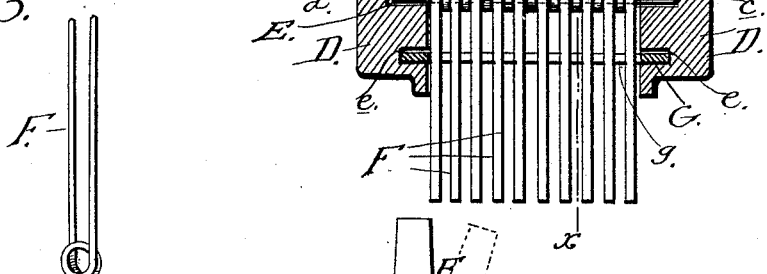
Figure 2:
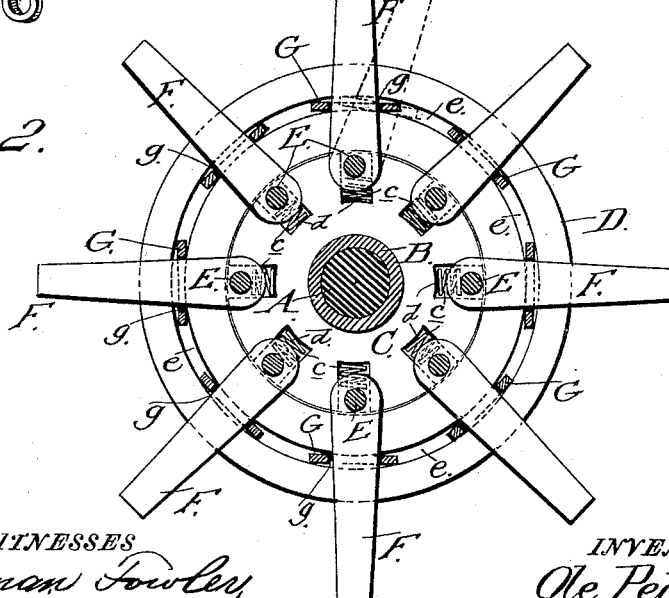

Figure 1 represents a longitudinal sectional view of a rotary cutter embodying my invention. Fig. 2 is a cross-sectional view of the same on the line $x$ $x$ of Fig. 1. Fig. 3 is a modified form of cutter-bar.

My invention relates to devices for cutting and dressing marble, slate, and analogous material by centrifugal force; and it consists of the constructions and combinations of parts hereinafter fully described, and specifically pointed out in the claims.

To enable others skilled in the art to which my invention appertains to make and use the same, I will now describe its construction and indicate the manner in which the same is carried out.

In the accompanying drawings, A represents an arbor upon which the head or cutter is secured, so that it may rotate with the arbor. The arbor is formed with suitable journals, and near one end it is threaded to receive a nut $a$, and between this nut and a collar or flange $b$ on the arbor a sleeve B is fitted and provided with end flanges or collars C, each having a series of radially-disposed recesses $c$ formed in its periphery and adapted to contain cushions or springs $d$, the purpose of which will be hereinafter described. On the arbor, contiguous to the flanges or collars C, are disks D, having their inner faces recessed to receive the collars C, whereby the inner faces of each collar and its adjacent disk are practically flush, and the said inner faces of the disks are formed with circular grooves $e$ to form guides for the yokes of the cutter-bars, as I shall hereinafter explain. Arranged around the collars C, so that their ends may rest upon the cushions or springs in the radial openings or recesses $c$, are the rods E, which carry the cutter-bars F, said bars having openings in their inner ends through which the rods pass, whereby the cutters are loosely or pivotally hung. Each rod carries a number of cutter-bars, which may be pieces of flat metal, or, if preferred, may be formed of strong wire coiled at their inner ends to form eyes for the passage of the rods E, and having the outer ends forming two parallel members, each serving as a cutter, as shown in the modification in Fig. 3.

The cutter-bars may be separated from each other by washers to provide for the free independent movement of each bar, and all of the bars on each rod E are held together by a yoke or frame G, having a longitudinal slot $g$, through which the cutter-bars pass, the said yokes or frames having their ends extended beyond the outermost cutter-bar and adapted to enter the grooves $e$ in the end disks D, whereby these yokes or frames have a free movement in the guides thus formed.

From the description heretofore given it will be understood that this cutter is designed to have a rapid rotary movement, which, combined with the loose mounting of the cutter-bars in series, causes the latter to be thrown outward by centrifugal force against the face of the stone, marble, slate, or other like substance to be operated upon, and to thereby cut and dress the face of said substance. In the event of any other cutter-bars striking a projection on the face of the stone which would tend to break or bend said bars the cushions or springs $d$, upon which the ends of the rods E rest, will yield to the extra pressure and enable the bars of the series to move inward toward the center until the obstruction is passed, when the springs or cushions return the rods and bars into their normal positions.

When the modified form of cutter shown in Fig. 3 is used, the arms or members of the cutter form two separate cutting-surfaces, which may be advisable in light work.

Having thus described my invention, what I claim as new, and desire to secure by Letters Patent, is—

1. A rotary cutter for dressing stone and analogous material by centrifugal force, consisting of a rotatable head mounted upon an arbor, cutter-bars carried by said head and having their inner ends pivotally mounted on yielding bearings, and slotted yokes or frames embracing the cutter-bars in series and moving in guides, substantially as herein described.

2. A rotary cutter for dressing stone and analogous material by centrifugal force, consisting of an arbor, a sleeve thereon having end collars or flanges provided with peripheral recesses, cushions or springs in said recesses, rods having their ends mounted on said cushions or springs, disks for holding the bars in place, and cutter-bars pivotally hung upon said rods in series and adapted to be thrown by centrifugal force against the surface to be operated upon, substantially as herein described.

3. A rotary cutter for dressing stone and analogous material by centrifugal force, consisting of an arbor, a sleeve thereon having end collars or flanges provided with radial recesses in their peripheries, cushions or springs in said recesses, rods arranged around the collars with their ends resting upon the cushions or springs, the end disks having recesses for the reception of the collars and ends of the rods, whereby the rods are held in place, cutter-bars in series loosely mounted at their inner ends upon said rods, and yokes or frames embracing the outer portions of the bars in series and having their ends mounted in grooves in the inner faces of the disks, substantially as herein described.

OLE PEDERSON.

Witnesses:
MIEAR PEDERSON,
ARTHUR HODGDON.